United States Patent [19]

Wallskog

[11] Patent Number: 5,048,876
[45] Date of Patent: Sep. 17, 1991

[54] CLOSURE APPARATUS FOR PIPES AND VESSELS

[75] Inventor: Harvey A. Wallskog, Irvine, Calif.
[73] Assignee: Fluor Corporation, Irvine, Calif.
[21] Appl. No.: 431,024
[22] Filed: Nov. 2, 1989
[51] Int. Cl.⁵ .............................................. F16L 17/06
[52] U.S. Cl. .................................. 285/364; 285/420; 138/89
[58] Field of Search ............... 285/364, 406, 408, 420, 285/421, 337; 138/186

[56] References Cited

U.S. PATENT DOCUMENTS

| | | | |
|---|---|---|---|
| 48,038 | 6/1865 | Barnard | 285/364 X |
| 771,388 | 10/1904 | Nusbaum | 285/337 |
| 2,689,753 | 9/1954 | Wechsler | 285/364 X |
| 3,058,761 | 10/1962 | Christophersen | 285/364 X |
| 4,288,116 | 9/1981 | Schllenger | 285/364 |

FOREIGN PATENT DOCUMENTS 1269847  6/1968  Fed. Rep. of Germany ...... 285/364

Primary Examiner—Dave W. Arola
Attorney, Agent, or Firm—Lyon & Lyon

[57] ABSTRACT

A closure apparatus for pipes, vessels and the like includes a ring member which extends around the perimeter of a pair of flanges. The ring member includes a plurality of rollers that engage the nonmating sides of the flanges and impart a closing force thereon. The ring is rotatable between a locked position wherein the flanges are pressurized to an unlocked position wherein the rollers align with slots extending around the periphery of one or both of the flanges, whereby the flanges can be pulled apart.

7 Claims, 4 Drawing Sheets

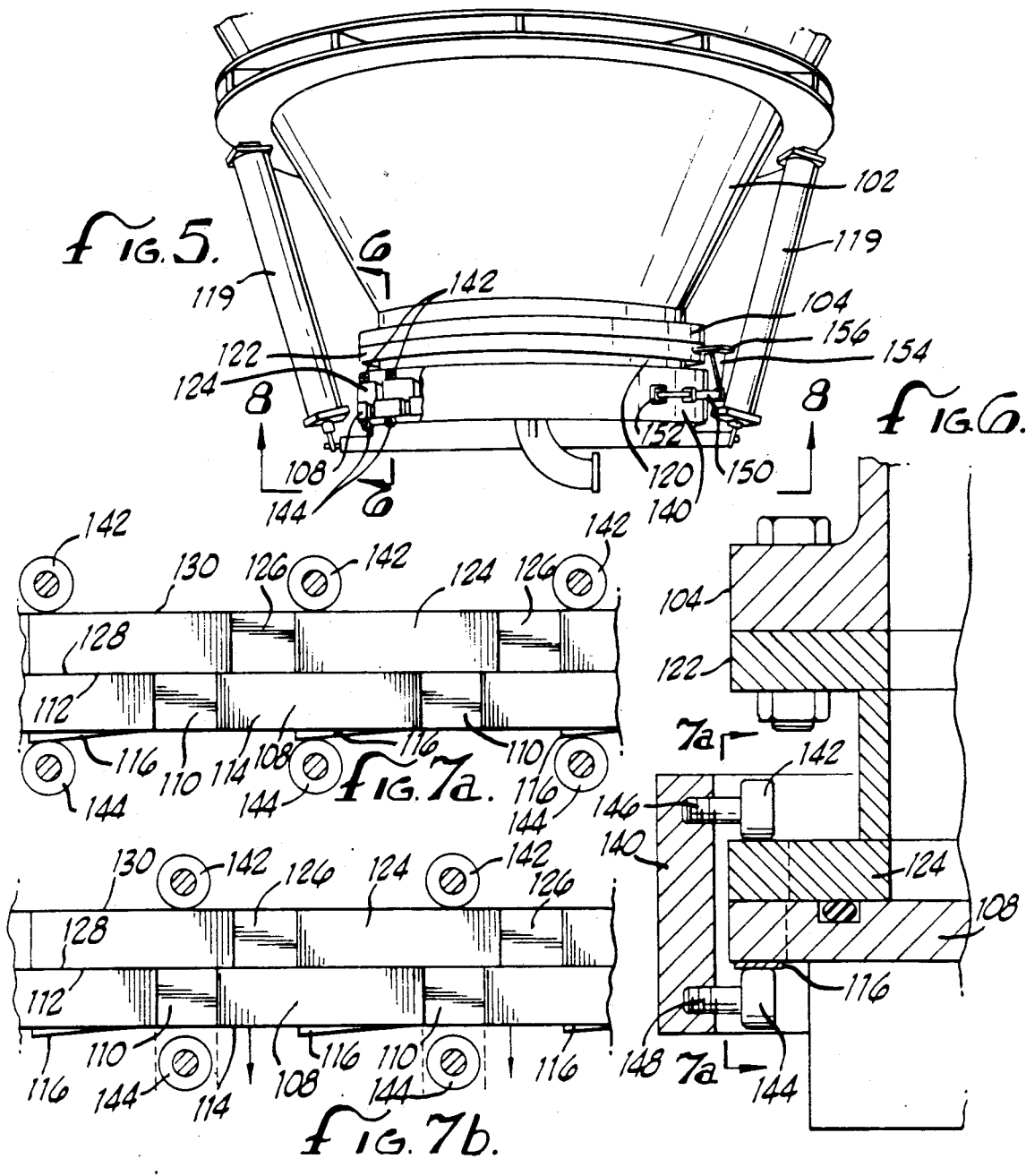

CLOSURE APPARATUS FOR PIPES AND VESSELS

BACKGROUND OF THE INVENTION

1. Field of the Invention

The field of the present invention is couplings and closures for pipes and vessels, particularly as used in applications where high pressures, high temperatures and dirty and hazardous conditions obtain, and frequent or rapid opening is required.

2. Description of The Prior Art

Bolted flanges have been used to join sections of pipes and for blind flange closures on vessels and pipes for many decades. For many applications involving high pressures and/or temperature extremes, this approach, when used with suitable gaskets, has been satisfactory. To assure the safety of operations, most piping and vessel systems are designed to be in accordance with the American Society of Mechanical Engineers (ASME) Boiler and Pressure Vessel Code, Section VIII, Division I, and the American National Standards Institute (ANSI) Code for Pressure Piping (B31). Further, the ASME Code allows the use of flanges made to recognized Standards such as "Steel Pipe Flanges and Flanged Fittings", ANSI B16.5. Additional acceptable flange Standards are provided by the American Petroleum Institute (API) or the American Water Works Association (AWWA), for example.

The flanges that result from the application of these Codes and Standards employ a substantial number of bolts to secure the two flange faces together. The number and size of the bolts is determined from consideration of three factors - the pressure and temperature of the working fluid and the mechanical properties of the gasket. The selection of the configuration and material(s) of a gasket is dependent not only on the pressure and temperature of the material to be confined but the chemical nature of the working fluid as well. Gaskets that are suitable for high pressures and/or moderate to high temperatures require a high seating stress (i.e., the flange bolts must supply a large enough force to deform the gasket in order to obtain a good seal). Typical gasket materials for such services require a minimum seating stress of several thousand pounds per square inch (values range from a few hundred to greater than twenty-five thousand). As a result frequently more bolts are required to deform the gasket than are necessary to hold the pressure.

The assembly and disassembly of a large flanged joint connection with dozens of bolts is a very labor intensive and time consuming operation, but has been accepted because in most circumstances:

the vessel or piping closed by the joint contains no hazardous material when the joint is to be opened; and the work location is reasonably accessible; and the time needed to bolt and unbolt is acceptable; and the need to open the flanged joint is infrequent.

For many operations where these four conditions do not prevail, however, and for flanges with diameters of about 24 inches or greater there has not been an attractive alternative to the bolted flanged joint. Industry has been obliged to use time consuming safety procedures to avoid exposing workers to hazardous fluids and to accept the large time losses involved in removing and replacing bolts.

Operators of industrial processes, as well as many research and development facilities, are concerned with two important characteristics of their operations — productivity and safety. Not all industrial processes involve toxic materials or present dangerous working conditions. However, virtually all operations could benefit from a reduction in the time required for equipment maintenance or replacement and process reconfiguration. In a commercial setting a reduction in process down-time usually translates directly into increased plant throughput (i.e., increased marketable product or profit for the facility). In laboratory or experimental facilities, faster component replacement or equipment reconfiguration means greater flexibility in the conduct of experiments and a significant improvement in facility utilization.

A substitute for conventionally bolted flanges may be particularly desirable when any one or more of the following conditions exist:

the process equipment contains hazardous or toxic materials at the time the joint must be opened (i.e., gases, liquids and/or solids that present hazards to personnel such as pressure, temperature, toxicity, noise, radiation, etc.); and/or, the work location is not reasonably accessible (i.e., work area includes uncontrollable hazards nearby or is physically remote and dangerous); and/or, it is necessary to return the equipment to a functional status promptly (i.e., process or facility back on-line to maintain productivity); and/or, certain critical components are subject to relatively frequent failure, especially if an entire process or facility must be shutdown until replacement is effected.

Numerous "quick coupling" devices have been proposed during recent decades. In an attempt to replace the conventionally bolted flange, many designs employ a variation of the breech lock used in large artillery pieces — usually a set of lugs mounted to one of the mating elements that provide mechanical interference with another set of lugs mounted to the other mating element, whereby the two elements must be rotated with respect to each other to effect locking.

In some designs a rotating ring is provided, thus eliminating the requirement that one of the mating components rotate relative to the other. Large autoclave closures are an example of this approach. FIG. 10 shows such an arrangement wherein a rotating ring includes pairs of opposing lugs which engage corresponding lugs on the mating elements. In order to provide an axial force to compress the seal or gasket between the elements, the lugs of one of the elements include wedges that ride against the lugs on the locking ring as it is rotated, causing the elements to be pressed together.

Both the breech lock and rotating ring approaches discussed above obtain lock-up of the connection through the action of sliding contact of metal surfaces, which is a fundamental weakness of these approaches, particularly in dirty and hazardous environments. High friction forces and the potential to gall the contact surfaces may also prevent the generation of the large axial force required to seat the gasket. Thus, the prior art devices are not particularly suited to withstand high pressure and high temperature and to be opened and closed many times without requiring repairs.

SUMMARY OF THE INVENTION

The present invention is directed to a closure apparatus comprising roller means adapted to appropriately fasten two flanges together. The roller means are configured to engage opposing surfaces of the two flanges, and impart a flange closure force thereon when driven from an unlocked to a locked position.

It is an object of the present invention to provide a closure apparatus that is not only simple, rugged and reliable but is cost effective as well when compared with conventional practice or prior art.

It is a further object of the present invention to provide closure apparatus appropriate for use under extreme dirty and abrasive conditions.

It is a further object of the present invention to provide a closure apparatus capable of generating the large closure force necessary to seat metal or other gaskets suitable for high temperatures and/or pressures, and thus provide a much broader range of pressure and temperature applicability than afforded by methods or devices presently available.

It is a further object of the present invention to provide a closure apparatus that is sturdy, durable and capable of quick engagement or disengagement for pipes or vessels of virtually any size (manual or power actuated, as required).

It is a further object of the present invention to provide a closure apparatus capable of rapid operations compared to conventionally bolted flanges as well as enhanced safety by avoiding exposing operating personnel to hazardous situations (i.e., the handling of process materials — gases, liquids and/or solids — that present hazards such as pressure, temperature, toxicity, noise, radiation, etc.).

BRIEF DESCRIPTION OF THE DRAWINGS

FIG. 5 is a perspective view of a device constructed in accordance with the present invention for use at a petroleum coke production facility. The device is shown in a closed and locked position.

FIG. 6 is a cross-sectional view taken through line 6—6 in FIG. 5.

FIG. 7a is a cross-sectional view taken along line 7a—7a in FIG. 6. The apparatus is shown in a closed and locked position.

FIG. 7b is a cross-sectional view taken along line 7a—7a in FIG. 6. The apparatus is shown in an unlocked position.

FIG. 10 shows a locking mechanism for an autoclave device of the prior art.

DETAILED DESCRIPTION OF PREFERRED EMBODIMENTS

The invention will now be described herein by way of example only and not by way of limitation, and, it will be appreciated, encompasses apparatus which can be used to secure together a wide variety of pipe and vessel configurations. Further, apparatus constructed in accordance with the invention can be used to fasten together any suitable structure and are especially suitable for arrangements that need to be changed frequently or need to be remotely operated. For those situations involving hazardous conditions or environments, it will be understood that the handling of the components (e.g. blind flanges, pipe or vessel sections, structural elements, etc.) can also be accomplished remotely.

Figure 1:
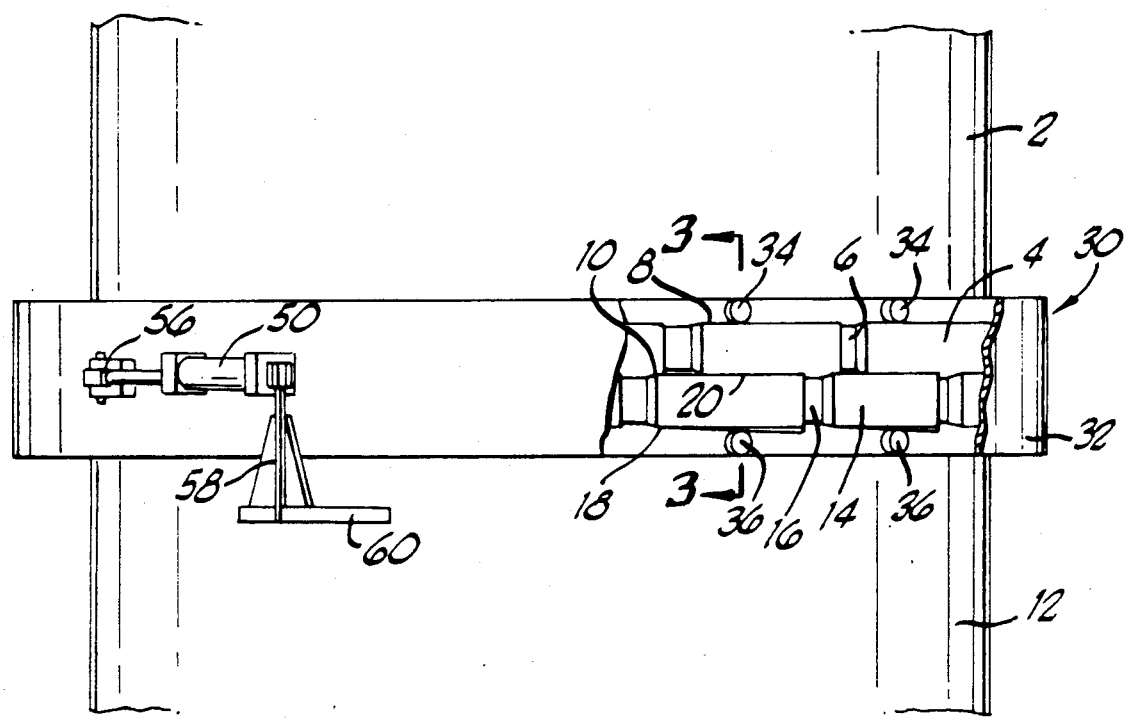
FIG. 1 a plan view of a closure apparatus constructed in accordance with the present invention, having a section broken away for clarity. The apparatus is shown in a closed and locked position.
Figure 2:
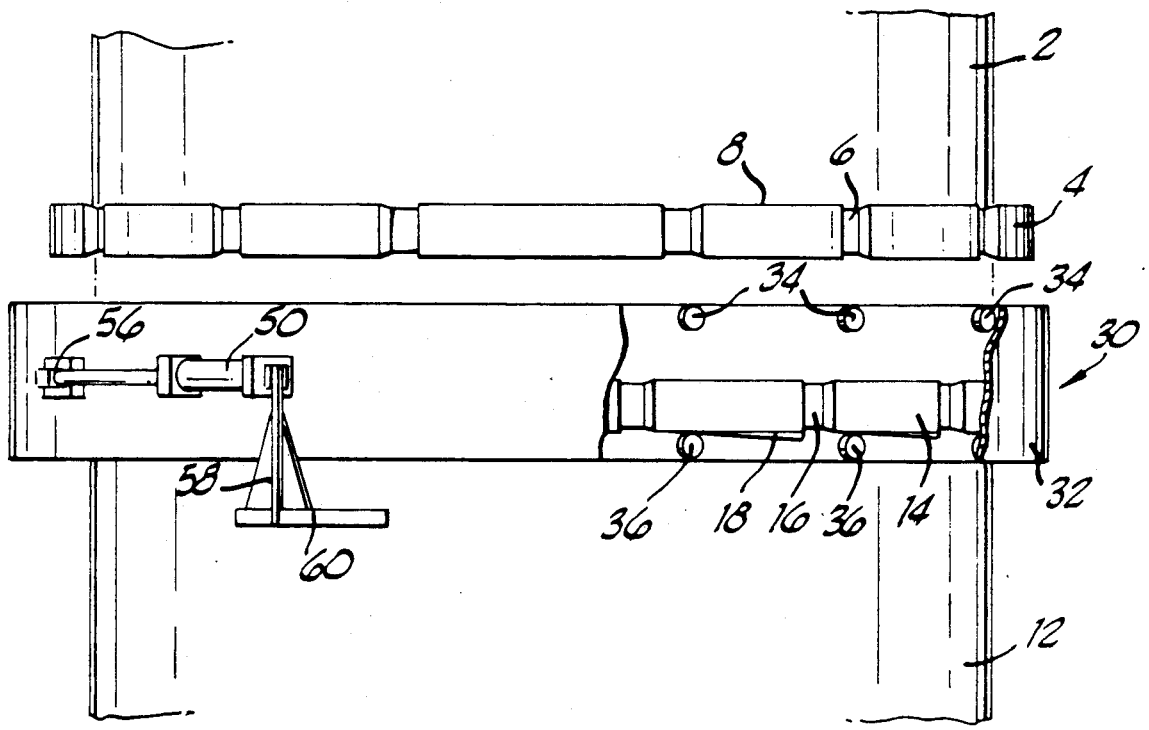
FIG. 2, is a plan view of the closure apparatus of FIG. 1, having a section broken away for clarity. The apparatus is shown in unlocked and open position.
Figure 3:
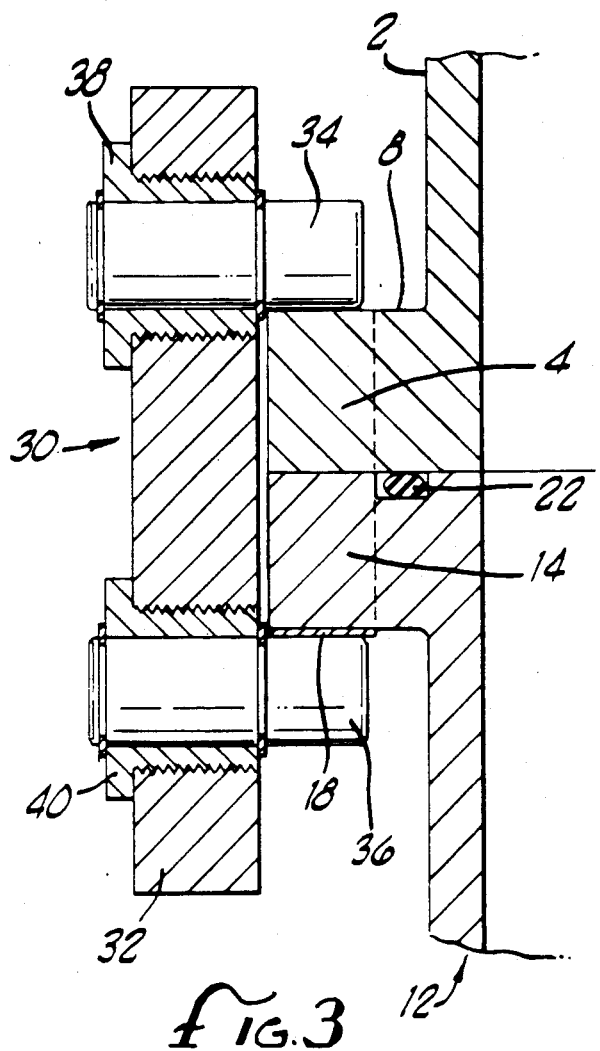
FIG. 3 is a cross-sectional view taken through line 3—3 in FIG. 1.

Referring to FIGS. 1 and 2, a closure apparatus is shown. A vessel 2 which is generally cylindrical in shape comprises an end flange 4 having a plurality of slots 6 disposed circumferentially therein. The flange 4 includes a roller bearing surface 8 and a flange mating surface 10. An opposing vessel 12 comprises a similar circumferential flange 14 having slots 16 disposed circumferentially therein. The flange 14 further includes a roller bearing surface 18 and a flange mating surface 20. As shown in FIG. 3, the roller bearing surface is sloped between each of the slots 16. The flange 14 also includes a seal or gasket 22. Joining the vessels 2 and 12 is a closure apparatus 30. The closure apparatus 30 comprises a generally ring-shaped body or ring member 32. Two sets of a plurality of rollers 34 and 36 are disposed on the circumferential interior surface of the ring member 32 on radially inwardly disposed axes. A first set of the rollers 34 is adapted to engage the bearing surface 8 of the flange 4 on the vessel 2. A second set of the rollers 36 is positioned to engage the bearing surface 18 of the flange 14 of the vessel 12 when the flanges 4 and 14 of the vessels 2 and 12 are positioned in mating engagement.

Referring to FIG. 3, the rollers 34 are rotatably mounted in the bushings 38 which are threadably engaged or otherwise secured in the ring member 32. Similarly, the rollers 36 are rotatably mounted in the bushings 40 which are likewise threadably engaged or otherwise secured in the ring 32.

As shown in FIGS. 1 and 2, the rollers 34 and 36 are sized to pass freely through the slots 6 and 16 of the vessels 2 and 12, respectively. As such, it will be appreciated that the numbers of the rollers 34 and 36 is equal to the number of corresponding slots 6 and 16. The ring member 32 is initially mounted to the vessel 12 by inserting the rollers 36 of the ring member 32 through the slots 16 of the flange 14 of the vessel 12, and rotating the ring member 32 until the rollers 36 rest on the bearing surface 18 of the flange 14. In this position, the ring member 32 is freely rotatable with respect to the vessel 12. The rotating motion of the ring member 32, however, is controlled and constrained by the actuators 50. Concurrently with this rotating action of the ring member 32, a closure force is induced on the flanges 4 and 14 by virtue of the slightly sloped camming surface 18. This slope is repeated between each of the slots 16 such that each of the rollers 36 are subjected to the slope as rotation of the ring member 32 occurs. To achieve the same camming action, it will be appreciated that the slightly sloped camming surface could be provided on the flange 4 instead of the flange 14.

Rotation of the ring member 32 is controlled by one or more actuators 50, mounted at one end to the vessel 12, and at the other end to the ring member 32. The actuators 50 are generally tangentially aligned with respect to the ring member 32 and thus serve to rotate the ring upon activation. The actuators 50 are pivotally connected to the ring member 32 through lug members 56. The actuators 50 are pivotally connected to the vessel 12 through arm members 58 extending generally axially from anchors 60. It will be appreciated by those skilled in the art that other methods and devices could be used to control the rotating motion of the ring member 32.

Referring to FIG. 2, it will be seen that with the ring member 32 mounted on the vessel 12 as shown, the set of rollers 34 are positioned to pass through the slots 6 of the vessel 2, thus allowing the vessel 2 to be separated from the vessel 12. Because the slots 16 in the flange 14 are circumferentially offset from the slots 6 in the flange 4 in this position, the ring member 32 remains engaged with the vessel 12. Alternatively, the slots could be aligned while the respective rollers rows are circumferentially offset.

Figure 4A:
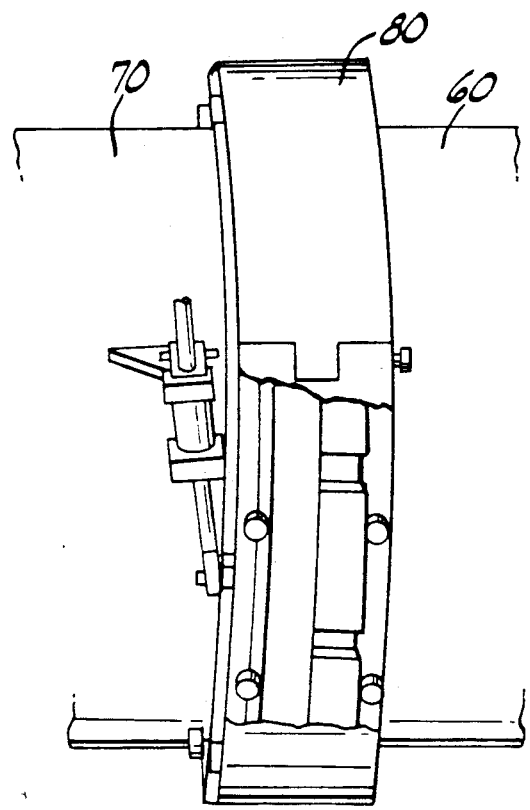
FIG. 4a is a view of the apparatus of FIG. 4, having a section broken away for clarity
Figure 4:
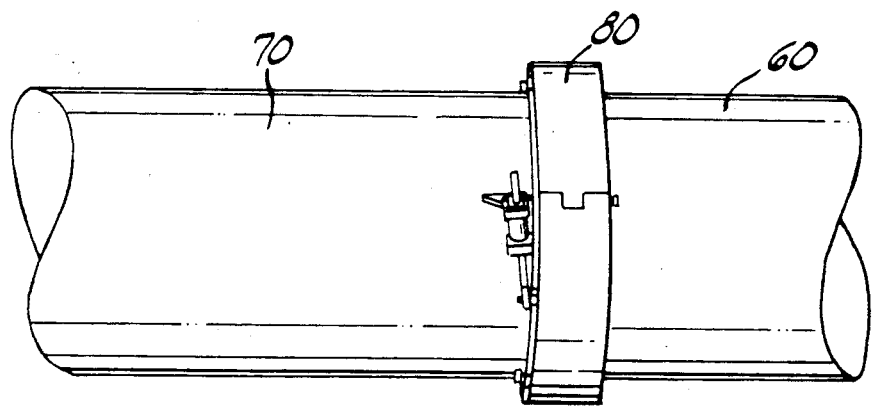
FIG. 4 is a perspective external view of a closure apparatus constructed in accordance with an alternate embodiment of the present invention.

Disassembly of the ring member 32 from the vessel 12 is achieved by disconnecting the actuators 50 and rotating the ring member 32 until the rollers 36 are aligned with the slots 16 in the flange 14. Alternatively, as shown in FIGS. 4 and 4a, a ring member 80 joining vessels 60 and 70 may be divided into two or more segments which are axially pinned together to facilitate assembly on one of the vessels. In this embodiment, the segmentation of the ring member 80 permits assembly without the need for slots in one of the two mating flanges.

To secure the vessels 2 and 12, the contact surfaces of the flanges 4 and 14 are brought into proximal engagement such that the flange 4 contacts the undeformed seal 22 (see FIG. 3) disposed in the flange 14. At this point, the ring member 32 is then rotated by means the actuators 50 into the locked position showing in FIG. 1. Because rotation of the ring member 32 results in the rollers 36 engaging the sloped surfaces 18 between the slots 16 of the flange 14, it will be observed that the slope of the surfaces 18 may be defined such that the engagement of the rollers 36 with said sloped surfaces 18 imparts a suitable closure force on the flanges 4 and 14 for deformation of the seal 22. Rotation of the ring member 32 in the opposite direction will, of course, depressurize the seal 22 and enable separation of the flanges 4 and 14 upon alignment of the rollers 34 with the slots 6.

Closure Apparatus Application Example

While apparatus constructed in accordance with the present invention can have many uses, the following relates to one such application for heading and deheading a delayed coker unit at a petroleum coke production facility.

Many refineries recover valuable products from the heavy residual oil that remains after the normal refining operations are completed. This recovery process, known as delayed coking, produces valuable distillates and coke in a large vessel called a coke drum. Typically coke drums are used in pairs and operated alternately. Thus, while one coke drum is being filled with the heated residual oil for a 16 to 24 hour cycle in which the volatile components are driven off for recovery elsewhere and the balance converted to coke, the other drum is being cooled and purged of the several hundred tons of coke formed during the previous recovery cycle. The operating conditions are quite severe. Normal operating pressure ranges from 40 to about 60 pounds per square inch and the feed input temperature is slightly over 900° F. In addition, operating personnel may be exposed to finely divided coke particles, steam, hot water and noxious gases, when the drum is opened.

Coke recovery operations commence following the water quench step. Here, water and steam are introduced into the coke filled vessel to cool the mass of coke. At this point the vessel is vented to atmospheric pressure and the top head (typically a 4 foot diameter flange) is unbolted and removed to enable placement of the hydraulic coke cutting apparatus. After the cooling water is drained from the vessel the bottom head (typically a 7 foot diameter flange) is unbolted and removed to allow the hydraulically cut (i.e., high pressure water jet) coke to fall out. A typical operating procedures manual will state — "Protective rain gear and face shields must be worn when deheading top and bottom coke drum heads".

Figure 9:
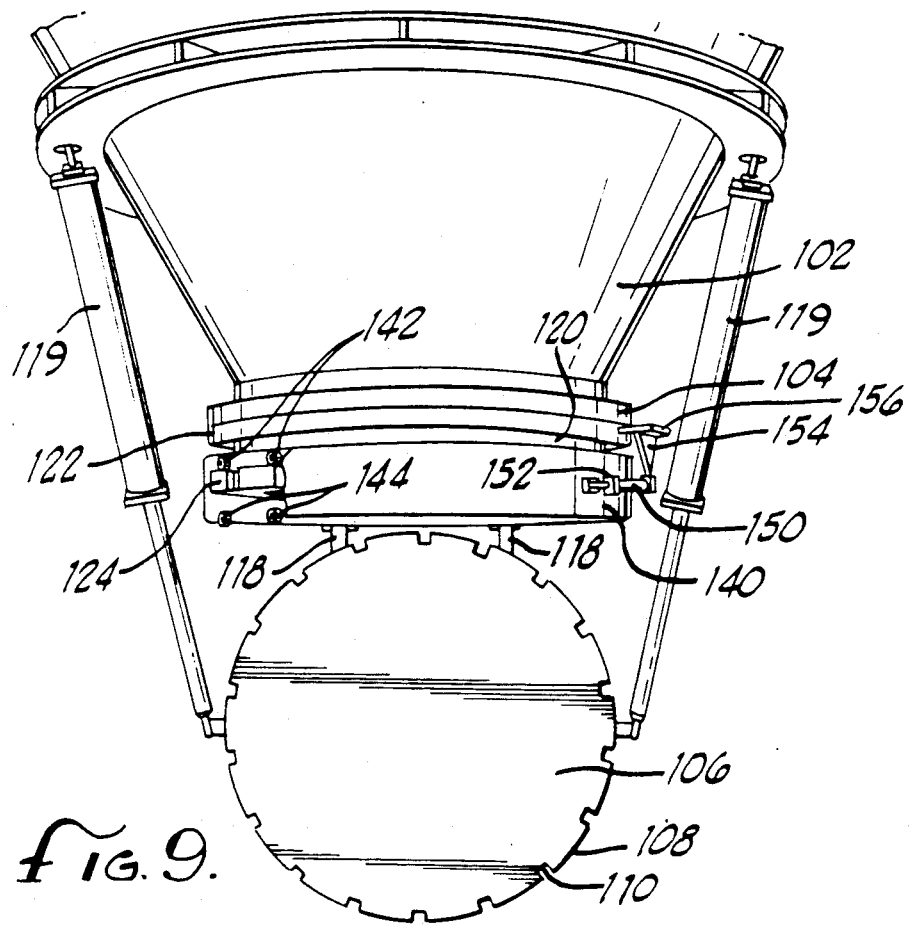
FIG. 9 is a perspective view of the device of FIG. 5. The device is shown in an unlocked and open position.

FIGS. 5 and 9 show generally the frusto conical bottom portion 102 of a delayed coker vessel. The upper portion of the coke drum is not shown, but in practice may extend 60-80 feet or more above the outlet portion shown in FIGS. 5 and 9. The substantially circular outlet flange 104 is the terminus of the drum bottom portion 102.

FIG. 9 shows the coke drum bottom portion 102 in an open position with a coke drumhead 106 being open to allow the contents of the coke drum to fall in to a chute (not shown) disposed below the outlet flange 104. The drumhead 106 includes a flange 108 having plurality of circumferentially arranged slots 110 disposed therein. As shown in FIGS. 7a and 7b, the flange 108 includes an upper mating surface 112 and a lower bearing surface 114. Disposed on the lower surface 114 between each of the slots 110, is a wedge member 116. The drumhead 106 is shown in a configuration wherein it is pivotally mounted with respect to the drum bottom portion 102 by a pair of hinges 118. The drumhead 106 is further attached to the drum bottom portion 102 by actuator means 119 which pivot the drumhead 106 between open and closed positions.

Mounted to the outlet flange 104 of the drum bottom portion 102 is a ring support member 120. The ring support member comprises an upper flange 122 configured to mate with the outlet flange 104, through a plurality of bolts arranged circumferentially around the flanges 104 and 122. The bolts are used in prior art devices to fasten the drumhead itself to the drum outlet. Because the device of FIGS. 5-9 has been retrofitted to an existing delayed coker unit, the ring support member 120 also functions as a readily installable adaptor. The ring support member (or adaptor) 120 further includes a lower flange 124 having a plurality of circumferentially arranged slots 126 extending therethrough. The flange 124 comprises a lower mating surface 128 and an upper bearing surface 130. The lower surface 128 is configured to mate with the upper surface 112 of the flange 108 when the coke drum is closed as shown in FIG. 5. These mating surfaces may be denoted the proximal flange surfaces whereas the nonopposing flange bearing surfaces may be designated the distal flange surfaces. Because the ring support member 120 functions in the present embodiment as a retrofit component, it will be appreciated that the lower flange 124 thereof could be formed directly on the drum bottom portion 102 in place of the outlet flange 104.

Turning to FIGS. 5, 6 and 9, there is shown further a generally cylindrical locking ring member 140. The ring member 140 includes upper and lower rows of a plurality of rollers 142 and 144, respectively, which may also be thought of as a series of roller pairs. As shown in greater detail in FIG. 6, each of the rollers 142, 144 is rotatably mounted to an axle 146 and 148, respectively, fixedly mounted to the ring member 140 and extending radially inwardly therefrom. Appropriate bearing means are provided so that the rollers 142, 144 may spin freely. As an alternative configuration, the rollers 142, 144 could be replaced with rollers made to rotate by virtue of appropriate bearings installed in the ring member 140 as shown in FIG. 3.

Turning to FIGS. 7a and 7b, the rollers 142, 144 are sized to pass freely through, the slots 126 of the ring support member 120, and the slots 110 of the flange 108, respectively. As such, it will be appreciated that the number of rollers 142, 144 is equal to the number of corresponding slots 126 and 110. The ring member 140 is initially mounted to the ring support member 120 by inserting the rollers 142 of the ring member 140 through the slots 126 of the ring support member 120, and rotating the ring member 140 until the rollers rest on the distal surface 130 of the lower flange 124 of the ring support member 120. In this position the ring member 140 is freely rotatable with respect to the ring support member 120. The rotating motion of the ring member 140, however, is controlled and constrained by the actuators 150 (see FIG. 5, 8 and 9). Concurrently with the rotating action of the ring member 140, a closure force is induced on the flanges 124 and 108 by the provision of a slight slope 116 on the distal surface 114 of the flange 108 of the drumhead 106. This slope is repeated between each of the slots 110 such that each of the rollers 144 are subjected to the same slope as rotation of the ring member 140 occurs. To achieve the same camming action, it will be appreciated that the slightly sloped surface could be provided on the distal surface of the flange 124 instead of the flange 108.

Figure 8:
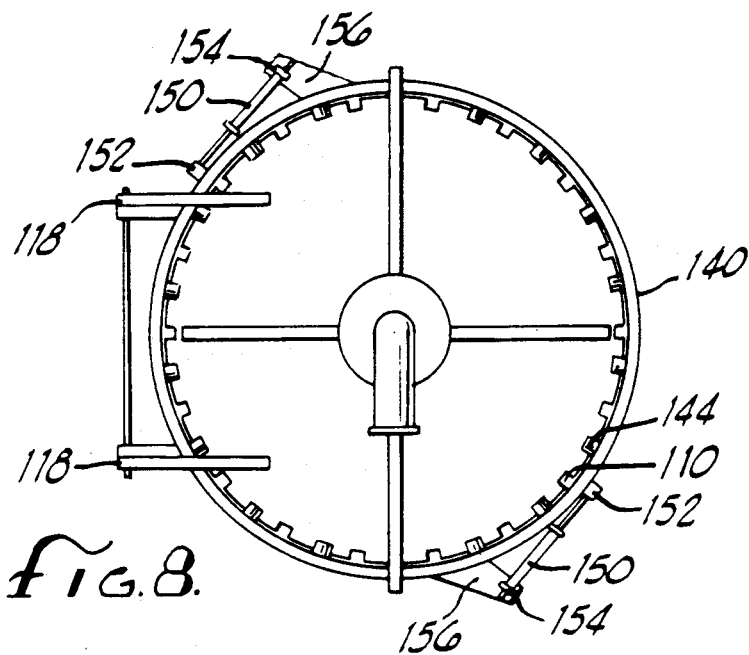
FIG. 8 is a bottom view of the device of FIG. 5.

Referring to FIGS. 5, 8 and 9, rotation of the ring member 140 is controlled by a pair of actuators 150, mounted at one end to the upper flange 122 of the ring support member 120, and at the other end to the ring member 140. The actuators 150 are generally tangentially aligned with respect to the ring member 140 and thus serve to rotate the ring member upon activation. The actuators 150 are pivotally connected to the ring member 140 through lug members 152. The actuators are pivotally connected to the ring support member 120 through arm members 154 extending generally axially from anchors 156. It will be appreciated by those skilled in the art that other methods and devices could be used to control the rotating motion of the ring member 140.

Referring to FIG. 7b, it will be seen that with the ring member 140 mounted on the ring support member 120 as shown, the lower set of rollers 144 of the ring member 140 are positioned to pass through the slots 110 of the flange 108 as the drumhead 106 is lowered for opening or raised for closure. Because the slots 126 in the flange 124 are circumferentially offset from the slots 110 in the flange 108 in this position, the ring member 140 remains engaged with the ring support member 120 throughout all phases of ring member movement. Alternatively, the slots could be aligned while the respective roller rows are circumferentially offset. Alternatively, the rollers and slots could each be placed in axial alignment such that unlocking would allow complete disassembly.

The proximal surface 112 of the flange 108 may thus be brought into engagement with the proximal surface 128 of the flange 124. At this point, the ring member 140 may be rotated by means of the actuators 150 into the locked position shown in FIG. 7a. Because rotation of the ring member 140 results in the rollers 144 engaging the sloped surfaces 116 between the slots 110 on the distal surface 114 of the flange 108, it will be observed that the slope of the distal surface 114 of the flange 108 may be defined such that the engagement of rollers 144 with said sloped surface imparts a suitable closure force on the flange 108 for deformation of a seal, as shown in FIG. 6. Rotation of the ring member 140 in the opposite direction will, of course, depressurize the seal and enable reopening of the drumhead 106 upon alignment of the rollers 144 with the flange slots 110.

Thus, a closure apparatus for pipes and vessels is disclosed. While embodiments and applications of the invention have been shown and described, it would be apparent to those skilled in the art that many more modifications are possible without departing from the inventive concepts herein. For example, it would be possible to mount rollers to the flanges themselves and provide associated slots in the ring member. It may also be possible to use other roller bearing-type means other than rollers. The invention, therefore, is not to be restricted except in the spirit of the appended claims.

What is claimed is:

1. Apparatus for joining together first and second elements, comprising first and second elements each including a circumferential flange having a roller-bearing surface, a ring member adapted to be placed about said circumferential flanges, two sets of rollers disposed on the interior surface of said ring member, one set of said rollers adapted to engage the bearing surface of the flange of one of said elements and the second set of rollers adapted to engage the bearing surface of the flange of said second element, at least one of said flanges having openings therein through which said rollers may pass, and means attached to said ring member and to one of said elements to rotate said ring member and to cause said rollers to move circumferentially on said bearing surfaces, whereby said ring member may be selectively moved between a locked position wherein said flanges are joined and an unlocked position wherein one of said sets of rollers is aligned with said openings in said flange to permit said flanges to be separated.

2. The apparatus of claim 1 in which ring member is segmented.

3. The apparatus of claim 2 in which said sets of rollers are disposed in upper and lower circumferential rows and said rollers in said upper circumferential row are not axially aligned with respect to said rollers in said lower circumferential row.

4. The apparatus of claim 1 in which each of said flanges has openings therein through which said rollers may pass.

5. The apparatus in claim 4 in which said openings in said flanges are slots spaced about the edges of said flanges.

6. The apparatus of claim 5 wherein said slots and rollers are positioned such that all of said rollers cannot be simultaneously aligned with said slots.

7. In a petroleum coke vessel, including a generally cylindrical drum body, a drum outlet and a removable drumhead at the drum outlet, the improvement comprising a ring support member attached to said coke drum outlet, said support member comprising a flange having a plurality of openings therein, a roller-bearing surface and a flange mating surface, said drumhead including a flange having a plurality of openings therein, a sloped roller-bearing contact surface and an upper flange mating surface, a locking ring having upper and lower sets of rollers extending radially inwardly therefrom, said upper set of rollers supported by said ring support member roller-bearing surface and said lower set of rollers engaging said drumhead flange sloped roller-bearing surface, and means attached to said locking ring member and said ring support member to rotate said locking ring member and to cause said rollers to move circumferentially on said bearing surfaces, whereby said locking ring may be selectively moved between a locked position wherein said ring support member and said drumhead are joined and an unlocked position in which one of said sets of rollers is aligned with said openings in one of said flanges to permit said ring support member and said drumhead to be separated.

* * * * *